(12) United States Patent  
Keller

(10) Patent No.: US 6,547,301 B1  
(45) Date of Patent: Apr. 15, 2003

(54) DASHMAT WITH AN AIR DISTRIBUTION SYSTEM

(75) Inventor: Frederick P. Keller, Alto, MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 224 days.

(21) Appl. No.: 09/665,876

(22) Filed: Sep. 20, 2000

Related U.S. Application Data

(60) Provisional application No. 60/155,161.

(51) Int. Cl.[7] .............................................. B62D 33/00
(52) U.S. Cl. ..................... 296/39.3; 296/208; 165/42
(58) Field of Search ................. 296/39.3, 208; 165/42, 43, 203; 62/244; 237/12.34; 454/152, 144

(56) References Cited

U.S. PATENT DOCUMENTS

| | | | |
|---|---|---|---|
| 1,742,753 A | | 1/1930 | Caller |
| 2,651,986 A | | 9/1953 | Greig |
| 3,277,811 A | * | 10/1966 | Fischer ..................... 165/46 |
| 3,366,026 A | | 1/1968 | Herr et al. |
| 3,719,134 A | | 3/1973 | Korinth |
| 3,908,900 A | * | 9/1975 | Smith ..................... 237/12.3 A |
| 4,173,174 A | | 11/1979 | Vinko et al. |
| 4,289,195 A | * | 9/1981 | Bellot et al. ................. 165/42 |
| 4,413,550 A | * | 11/1983 | Piano ........................ 454/144 |
| 4,681,153 A | * | 7/1987 | Uchida ........................ 165/42 |
| 4,705,139 A | * | 11/1987 | Gahlau et al. ............. 181/286 |
| 4,782,742 A | | 11/1988 | Yott et al. |
| 4,782,913 A | * | 11/1988 | Hoffmann et al. .......... 181/286 |
| 5,052,283 A | * | 10/1991 | Altus ........................ 454/144 |
| 5,206,476 A | * | 4/1993 | Fresch et al. .............. 219/202 |
| 5,483,028 A | * | 1/1996 | Holwerda ................... 181/207 |
| 5,524,923 A | | 6/1996 | Henseler |
| 5,620,366 A | | 4/1997 | Munzel et al. |
| 5,673,964 A | * | 10/1997 | Roan et al. .................. 296/194 |
| 5,902,181 A | * | 5/1999 | Bain .......................... 454/144 |
| 5,921,100 A | * | 7/1999 | Yoshinori et al. ............. 165/43 |
| 6,024,190 A | * | 2/2000 | Ritzema ..................... 181/290 |
| 6,152,522 A | * | 11/2000 | Boulay et al. .............. 296/208 |
| 6,260,660 B1 | * | 7/2001 | Yoerkie et al. ............. 181/290 |
| 6,282,911 B1 | * | 9/2001 | Watanabe et al. ........... 296/208 |
| 6,318,796 B1 | * | 11/2001 | Felsen ........................ 296/208 |
| 6,332,330 B1 | * | 12/2001 | Loup et al. ................... 165/42 |
| 6,383,599 B1 | * | 5/2002 | Bell et al. ................... 296/208 |
| 2001/0032476 A1 | * | 10/2001 | Kampf et al. ................ 62/244 |
| 2002/0000314 A1 | * | 1/2002 | Danieau ..................... 165/203 |
| 2002/0007944 A1 | * | 1/2002 | Schwarz ..................... 165/203 |

FOREIGN PATENT DOCUMENTS

| | | |
|---|---|---|
| DE | 34 44 598 A1 | 6/1986 |
| GB | 449979 | 7/1936 |
| JP | 5-193407 * | 8/1993 |
| SU | 787-194 | 12/1980 |

* cited by examiner

Primary Examiner—Kiran Patel  
(74) Attorney, Agent, or Firm—McGarry Bair PC

(57) ABSTRACT

A dashmat for use in a vehicle passenger compartment comprising a firewall separating the passenger compartment from an engine compartment and a floorboard extending rearwardly from the firewall. The dashmat comprises a decoupling layer shaped to span the width of the vehicle passenger compartment. The decoupling layer has a lower surface adapted to abut the firewall and floorboard, and an upper surface adapted to face an interior of the passenger compartment. A header is formed in a front portion of the decoupling layer and is adapted to connect to a supply duct from a vehicle HVAC system. An air distribution channel is formed in the decoupling layer and extends rearwardly from the header through a substantial portion of the decoupling layer for distribution of conditioned air from the header throughout at least a front portion of the vehicle passenger compartment.

25 Claims, 3 Drawing Sheets

DASHMAT WITH AN AIR DISTRIBUTION SYSTEM

RELATED APPLICATIONS

This application claims priority on U.S. Provisional Application No. 60/155,161, filed Sep. 21, 1999.

BACKGROUND OF THE INVENTION

1. Field of the Invention

This invention relates to a vehicle dashmat with an air distribution system. In one of its aspect, the invention relates to HVAC air distribution systems for a vehicle. In another of its aspects, the invention relates to a dashmat incorporating an air distribution for directing conditioned air for the HVAC system throughout a vehicle passenger compartment.

2. Description of the Related Art

Virtually all contemporary vehicles include a heating, vent, and air conditioning ("HVAC") system for providing and distributing conditioned air throughout the interior of a vehicle passenger compartment. The conditioned air is generally distributed throughout the passenger compartment by an air distribution system, which typically comprises multiple channels or ducts fluidly connecting various portions of the passenger compartment interior with the conditioned air source, such as a heater, air conditioner, or exterior air. It is common to place a vent with or without adjustable louvers at the end of a fluid channel to control the direction of flow of the conditioned air from the distribution channel.

Initially, most vehicles limited the distribution channels within the confines of the vehicle dashboard and emit the conditioned air into the front seat area of the passenger compartment. There is a current trend, especially in larger vehicles, to provide distribution channels that extend into the rear seat of the vehicle passenger compartment to provide for a more even air distribution throughout the passenger compartment.

The increase in the number of distribution channels within the interior of the passenger compartment negatively impacts the usable volume of the passenger compartment, which is highly undesirable given the high value placed on passenger compartment volume by manufacturers and consumers. Additionally, the distribution channels can often result in unusual shapes to the passenger compartment interior because of the need to provide the distribution channels above the vehicle floor, such as in a console or the like. The addition of a distribution system structure to the interior of the passenger compartment also reduces the usable volume in combination with reducing the functionality of the available passenger compartment volume because of interference with passenger movement. Therefore, it is highly desirable to provide an air distribution system that minimizes the reduction of the available passenger compartment volume while permitting air distribution throughout the passenger compartment.

Current air distribution systems are also plagued by an additional problem in that almost without exception all sources of conditioned air are contained within the vehicle engine compartment, which is separated from the passenger compartment by a firewall, which is typically covered by a dashmat to reduce the sound passing from the engine compartment into the passenger compartment. The physical separation from the conditioned air sources and the air distribution system requires a fluid connection extending through the firewall and the dashmat, which requires the construction of openings through the dashmat that can reduce the dashmat's performance by permitting the transfer of sound from the engine compartment into the passenger compartment through openings in the dashmat and/or through the fluid conduit itself. Therefore, it is highly desirable to have an air distribution system that does not adversely impact the sound absorbing function of the dashmat.

SUMMARY OF THE INVENTION

The invention relates to a dashmat for use in a vehicle passenger compartment comprising a firewall separating the passenger compartment from an engine compartment and a floorboard extending rearwardly from the firewall. The dashmat comprises a decoupling layer shaped to span the width of the vehicle passenger compartment and typically has a barrier layer. The decoupling layer has a lower surface adapted to abut the firewall and floorboard, and an upper surface adapted to face an interior of the passenger compartment. According to the invention, a header is formed in a front portion of the decoupling layer and is adapted to connect to a supply duct from a vehicle HVAC system. An air distribution channel is formed in the decoupling layer and extends rearwardly from the header through a substantial portion of the decoupling layer for distribution of conditioned air from the header throughout at least a front portion of the vehicle passenger compartment.

The dashmat typically includes a cover closing the air distribution channel. The cover is preferably a barrier layer or, optionally, a carpet positioned on the upper surface of the decoupling layer. Alternatively, the carpet can be used in combination with the barrier layer by placing the carpet on top of the barrier layer. The barrier layer is preferably made from a filled elastomeric material that has sound deadening qualities.

The decoupling layer is preferably molded from foam for dampening vibrations passing through or associated with the firewall. The header and the distribution channel can each be formed by a reduced thickness portion of the decoupling layer.

Vents can be formed in the decoupling layer for directing the flow of conditioned air from the channel into the vehicle passenger compartment. Preferably, a cover overlies and closes the air distribution channel. The cover can have multiple through openings fluidly connecting the channel to the vehicle passenger compartment to define the vents. The multiple through openings each comprise a set of perforations, which are preferably spaced relative to each other.

The cover can be a carpet or a barrier layer positioned on the upper surface of the decoupling layer. The barrier layer is preferably made from a material, such as a dense elastomer, to retard the transfer of sound from the firewall and floorboard into the vehicle passenger compartment.

In another embodiment, the invention relates to a dashmat in combination with a vehicle passenger compartment comprising a firewall separating the passenger compartment from an engine compartment and a floorboard extending rearwardly from the firewall. The dashmat comprises a decoupling layer spanning the width of the vehicle passenger compartment and having a lower surface and upper surface. The lower surface abuts the firewall and the floorboard and the upper surface faces the interior of the passenger compartment. According to the invention, a header is formed in a front portion of the decoupling layer and connects to a HVAC supply duct outlet in the firewall. An air distribution channel is formed in the decoupling layer and extends rearwardly from the header through a substantial portion of the decoupling layer for distribution of conditioned air from the header throughout at least a front portion of the vehicle passenger compartment.

DESCRIPTION OF THE PREFERRED EMBODIMENT

Figure 1:
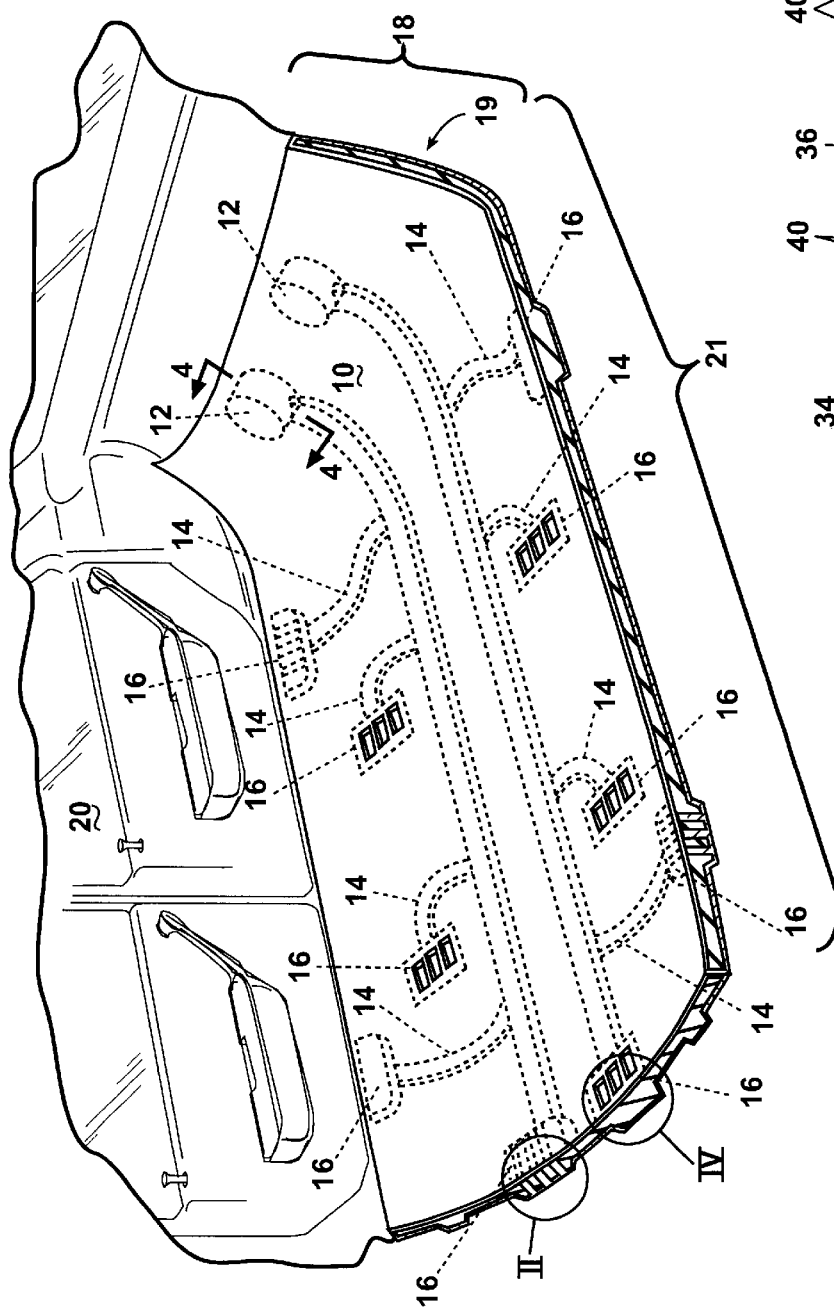
FIG. 1 is a perspective view of a vehicle air distribution system according to the invention and including a vehicle dashmat having a header with multiple distribution channels shown in phantom.

FIG. 1 illustrates a portion of a vehicle with an air distribution system according to the invention comprising a vehicle dashmat 10 with multiple headers 12 from which radiate a series of distribution channels 14, some of which terminate in vents 16. A front portion of the dashmat 10 is designed to lie against a vehicle firewall 18 that separates a vehicle engine compartment 19 from a vehicle passenger compartment 20 and reduces the sound transfer from the engine compartment 19 into the passenger compartment 20. A floorboard 21 extends from the end of the firewall to the rear of the passenger compartment 20 and separates the passenger compartment from the ground.

The headers 12 are adapted to fluidly connect to one or more sources of conditioned air (not shown) such a heater, an air conditioner, or venting from an outside air source, which is typically accomplished by the vehicles HVAC system. The conditioned air entering the headers 12 is then distributed through the distribution channels 14 throughout the interior of the passenger compartment and exits into the interior of the passenger compartment 20 through the vents 16 and the like.

Various air distribution channels 14 extend from the headers 12 to supply air to specific locations within the passenger compartment. As illustrated, the vents 16 are strategically placed beneath the location of the front seats in the passenger compartment to function as seat warmers. Some of the vents 16 are placed along the edges of the passenger compartment to provide for a more even distribution of air across the width of the passenger compartment. The most rearward vents are placed at the junction with the rear seat, but could easily be positioned underneath the rear seat to function as seat warmers. The advantage of the multiple headers 12 with an air distribution channels 14 is that the channels 14 and their associated vents 16 can be placed anywhere within the passenger compartment, front seat or rear seat areas, to more accurately control the flow of conditioned air.

The parallel headers 12 in FIG. 1 effectively divides the air flow distribution into left and right sides of the vehicle, providing for separate zones of conditioned air. It is within the scope of the invention for more than two headers to be used to define various zones within the dashmat corresponding to areas of the passenger compartment, each of which can be provided with control dampers to thereby independently control the conditioned air in each zone. For example, four headers can be used, with one header directed to the driver side and passenger side seating positions in both the front and rear seats. The headers can also extend laterally or have a curved shape. However the straight and longitudinal configuration is preferred in that provides for the greater flow rate of air from the front to the rear of the passenger compartment.

Figure 2:
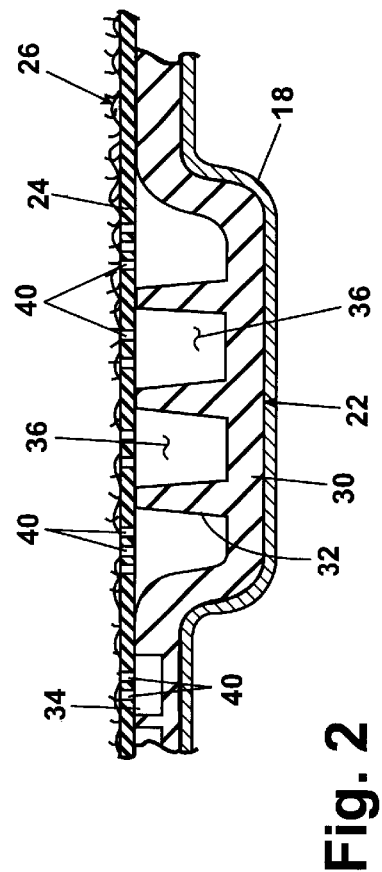
FIG. 2 is an enlarged view of a portion of the dashmat labeled area II in FIG. 1 and illustrating the distribution channels formed between a barrier layer and a decoupling layer of the dashmat and terminating in a vent.
Figure 3:
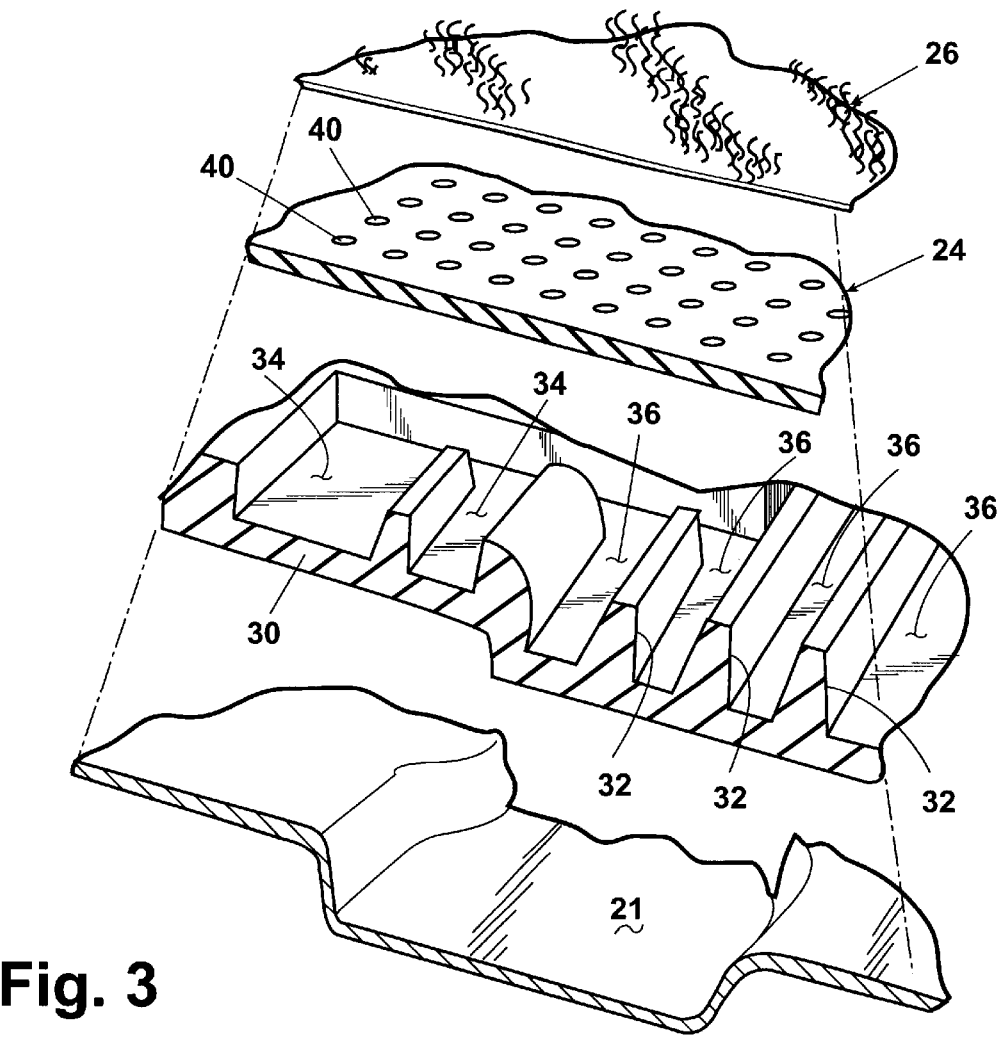
FIG. 3 is an exploded view of a portion of the area II of FIG. 1 and illustrating the relationship between the vent and the header.
Figure 4:
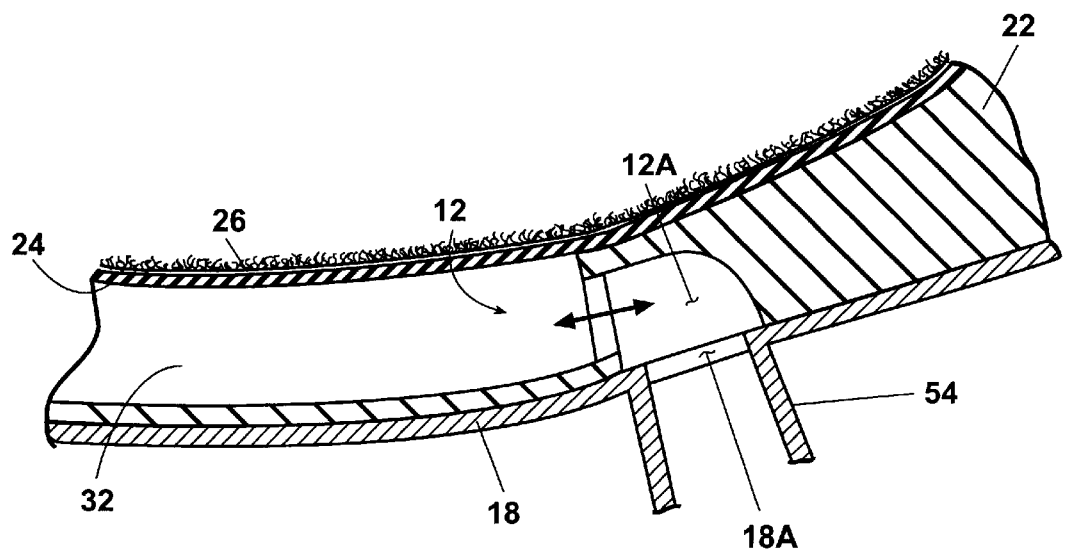
FIG. 4 is a sectional view taken along line 4—4 of FIG. 1 and illustrating the interface between the header and an HVAC supply.

The dashmat construction is shown in more detail in FIGS. 2–4. The dashmat 10 comprises a decoupling layer 22, barrier wall 24, and a carpet 26. The decoupling layer 22 is preferably made from a molded open-cell foam material that dampens sonic and mechanical vibrations passing through or associated with the firewall 18. The barrier layer 24 is preferably made from a more dense material, such as filled elastomer, and is mounted to the upper surface of the decoupling layer 22. The carpet 26 is preferably a wear-resistant and aesthetically pleasing material and is positioned on the upper surface of the barrier layer 24.

The decoupling layer 22 is preferably molded into a shape that conforms with the shape of the firewall 18 and floorboard 21. Generally, the lower surface of the decoupling layer 22 will conform to the upper surface contour of the firewall 18 and floorboard. The decoupling layer 22 is shown molded as a uniform thickness portion 30 that follows the contour of the firewall 18 and floorboard. Where there are depressions in the firewall 18 or floorboard 21, the decoupling layer 22 is provided with a series of ribs 32 that extend upwardly a sufficient height to form an effectively planar upper surface for the decoupling layer 22 against which the barrier layer 24 is positioned. This dashmat construction is shown in greater detail in U.S. Pat. No. 6,024,190 which disclosure is incorporated by reference.

The headers 12 are formed in the decoupling layer 22 and extend rearwardly from the firewall 18 to the end of the dashmat, which is positioned in the rear of the passenger compartment of the vehicle, upon assembly. In this configuration, the headers 12 control the main flow of conditioned air from the air sources along the entire length of the passenger compartment. The headers 12 preferably have an inlet opening 12A that aligns with an opening in the firewall 18A to which is mounted a supply duct 54 from the HVAC system to permit the flow of conditioned air form the HVAC system, through the firewall 18, and into the headers 12.

It should be noted that the header 12 as illustrated is for an HVAC configuration where the HVAC supply duct is adjacent the lower surface of the dashmat 10. Depending on the vehicle configuration, the HVAC duct can be located at an edge of the dashmat 10 and the header inlet opening would correspondingly extend to an be located at an end of the dashmat 10.

The air distribution channels are also formed in the decoupling layer. The distribution channels, as the headers, can either be directly molded into the uniform thickness portion 30 as illustrated by distribution channel 34 or formed by the ribs 32 in combination with the uniform thickness portion 30 as illustrated by distribution channels 36. In other words, the headers 12 and air distribution channels 14 can be formed by multiple channels 36, which are defined by the spaced ribs 32. The barrier layer 24 closes the top of the distribution channels 34 and 36. The ribs 32 help prevent the carpet from falling into the header or air distribution channel.

The ribs 32 are preferably oriented so that they longitudinally align with the air flow direction. However, if they are not so aligned, the ribs can have through openings or be discontinuous to permit the passage of air as is illustrated in FIG. 3.

The barrier layer can have multiple outlet openings 40 formed therein directly above the distribution channels 34, 36. The outlet openings 40 permit the air passing through the distribution channels 14 to enter the passenger compartment by exiting the outlet openings 40 and passing through the carpet 26. The outlet openings 40 are illustrated as a series or set of closely spaced perforations. However, larger and fewer openings could be used instead of the smaller perforations.

The carpet 26, which is typically carpet, has a weave or backing containing sufficient interstitial spaces to permit the air to pass therethrough. Advantageously, the weave and material of the carpet 26 can be selected to function as a filter and remove various particles from the air exiting the distribution channels 14.

Figure 5:
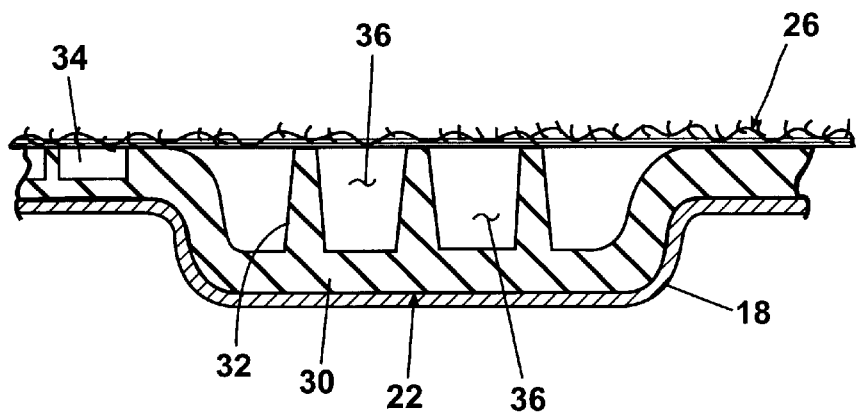
FIG. 5 is similar to FIG. 2 and illustrates an alternative dashmat construction without a barrier layer and utilizing a carpet layer to cover the decoupling layer.

FIG. 5 illustrates an alternative construction for the dashmat 10, which is generally identical to the construction shown in FIG. 2, except that the barrier layer has been removed. In the alternative construction, the carpet 26 closes the tops of the distribution channels, negating the need to provide outlet openings through the barrier layer. The use of only the carpet 26 on top of the decoupling layer 22 permits a greater flow rate of air from the distribution channels into the passenger compartment than what is obtainable with the barrier layer and its associated outlet openings 40 as disclosed in FIG. 2.

Figure 6:
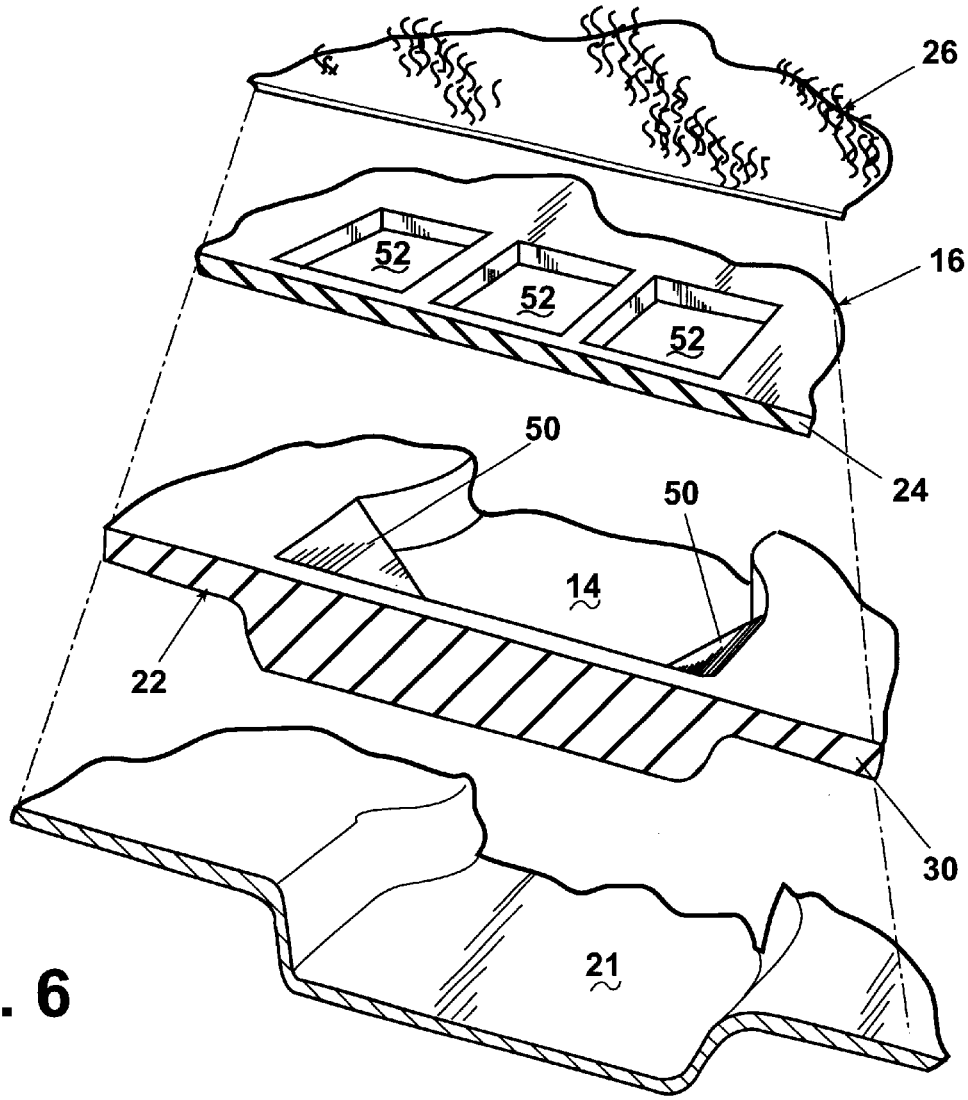
FIG. 6 is an enlarged view of a portion of the dashmat of FIG. 1 illustrating the vent located at the end of a distribution channel.

FIG. 6 illustrates a vent 16 formed in the dashmat 10 for controlling the direction of the conditioned air emitted from the distribution channels 14. Although the vent 16 is shown in the context of the dashmat construction of FIG. 2, the vent 16 can easily be applied to the alternative dashmat construction of FIG. 5. The vent 16 is formed by molding deflecting surfaces 50 in the uniform thickness portion 30 of the decoupling layer 22. The deflecting surface 50 is preferably located at the end of the distribution channel 14. An outlet opening 52 is formed in the barrier layer 24 above the deflecting surfaces 50. Thus, as the air flows along the distribution channels 14 and contacts the deflecting surface 50, the air is deflected according to the angle of the deflecting surface 50 through the outlet opening 52 and through the carpet 26.

It is within the scope of the invention for the carpet 26 to be removed around the outlet openings 52 so as not to change the direction of the air flow as controlled by the deflecting surfaces 50. The openings 52 can be replaced with a set of perforations as illustrated in FIG. 2. Also, ribs 32 can be formed in the channel 14 if needed to prevent the carpet or barrier layer from sagging into the channel 14.

The deflecting surfaces 50 can be formed at any desired angle, including vertical side walls. There can be one or more deflecting surfaces for each air distribution channel 14.

It is within the scope of the invention for the vent 16 to include a recess formed in the uniform thickness layer and having an open top extending through the barrier layer. The recess can be shaped to receive a traditional vent that can have one or more fixed or moveable louvers to thereby permit control of the direction the air emitted from the distribution channel.

The air distribution system according to the invention has many advantages over the prior art. One advantage is that the distribution channels do not diminish the interior volume of the passenger compartment because the distribution channels are retained entirely within the dashmat. The distribution channels of the invention will not protrude into the passenger compartment but can still be directed throughout the entire passenger compartment, providing pinpoint heating or cooling. The ability to provide widespread air distribution throughout the interior of the passenger compartment along with pinpoint heating and cooling in combination with minimal impact on the available passenger compartment volume is a great improvement over prior air distribution systems.

Another advantage of the air distribution system of the invention is that there is no longer a need for the HVAC system to have a fluid conduit passing through the dashmat, eliminating the sound transfer performance loss or increased complexity associated with the prior art dashmats. Yet another advantage of the air distribution system according to the invention is that the air distribution system in the dashboard can be entirely eliminated, resulting in more available space in the dashboard or a reduction of the physical size of the dashboard, resulting in an increase in available passenger compartment volume.

While the invention has been specifically described in connection with certain specific embodiments thereof, it is to be understood that this is by way of illustration and not of limitation. Reasonable variation and modification are possible within the scope of the foregoing disclosure without departing from the scope of the invention which is defined by the appended claims.

What is claimed is:

1. A dashmat for use in a vehicle passenger compartment comprising a firewall separating the passenger compartment from an engine compartment and a floorboard extending rearwardly from the firawall, the dashmat comprising:

a decoupling layer shaped to span the width of the vehicle passenger compartment, having a lower surface adapted to abut the firewall and floor board and having an upper surface adapted to face an interior of the passenger compartment, a header formed in a front portion of the decoupling layer and adapted to be connected to a supply duct from a vehicle HVAC system; and an air distribution channel with an open top formed in the upper surface of the decoupling layer and extending rearwardly from the header through a substantial portion of the decoupling layer for distribution of conditioned air from the header throughout at least a front portion of the vehicle passenger compartment.

2. The dashmat according to claim 1, and further comprising a cover closing the open top of the air distribution channel.

3. The dashmat according to claim 2, wherein the open top opens onto the upper surface and the cover is a carpet positioned on the upper surface of the decoupling layer.

4. The dashmat according to claim 2, wherein the cover is a barrier layer formed of a filled elastomeric material that has sound deadening qualities positioned on top of the upper surface for retarding the transfer of sound from the firewall and floorboard into the vehicle passenger compartment.

5. The dashmat according to claim 1, wherein the decoupling layer is molded from a synthetic resin foam for dampening vibrations passing through or associated with the firewall.

6. The dashmat according to claim 5, wherein at least one of the header and the distribution channel is formed by a reduced thickness portion of the decoupling layer.

7. The dashmat according to claim 1, and further comprising vents formed in the decoupling layer for directing the flow of conditioned air from the channel into the vehicle passenger compartment.

8. The dashmat according to claim 7, and further comprising a cover overlaying and closing the open top of the air distribution channel and the cover having multiple through openings fluidly connecting the channel to the vehicle passenger compartment to define the vents.

9. The dashmat according to claim 8, wherein the multiple through openings each comprise a set of perforations.

10. The dashmat according to claim 9, wherein each multiple through opening comprises a set of perforations.

11. The dashmat according to claim 10, wherein each set of perforations is spaced relative to each other.

12. The dashmat according to claim 8, wherein the cover is a carpet positioned on the upper surface of the decoupling layer.

13. The dashmat according to claim 8, wherein the cover is a barrier layer formed of a filled elastomeric material that has sound deadening qualities positioned on top of the upper surface for retarding the transfer of sound from the firewall and floorboard into the vehicle passenger compartment.

14. A dashmat in combination with a vehicle passenger compartment comprising a firewall separating the passenger compartment from an engine compartment and a floorboard extending rearwardly from the firewall, the dashmat comprising:

a decoupling layer spanning the width of the vehicle passenger compartment, having a lower surface abutting the firewall and the floorboard, and having an upper surface facing the interior of the passenger compartment;

a header formed in a front portion of the decoupling layer and connected to a HVAC supply duct outlet in the firewall; and an air distribution channel with an open top formed in the upper surface of the decoupling layer and extending rearwardly from the header through a substantial portion of the decoupling layer for distribution of conditioned air from the header throughout at least a front portion of the vehicle passenger compartment.

15. The combination according to claim 14, wherein the decoupling layer is molded from a synthetic resin foam for dampening vibrations passing through or associated with the firewall.

16. The combination according to claim 14, wherein at least one of the header and the distribution channel is formed by a reduced thickness portion of the decoupling layer.

17. The combination according to claim 14, and further comprising vents formed in the decoupling layer for directing the flow of conditioned air from the channel into the vehicle passenger compartment.

18. The combination according to claim 14, and further comprising a cover overlying and closing the open top of the air distribution channel and the cover having multiple through openings fluidly connecting the channel to the vehicle passenger compartment to define the vents.

19. The combination according to claim 18, wherein the multiple through openings each comprise a set of perforations.

20. The combination according to claim 19, wherein each multiple through opening comprises a set of perforations.

21. The combination according to claim 20, wherein each set of perforations are spaced relative to each other.

22. The combination according to claim 18, wherein the cover is a carpet positioned on the upper surface of the decoupling layer.

23. The combination according to claim 18, wherein the cover is a barrier layer positioned on top of the upper surface for retarding the transfer of sound from the firewall and floorboard into the vehicle passenger compartment.

24. The dashmat according to claim 1, wherein the air distribution channel is formed by a projection in a lower surface of the decoupling layer and sized to be received within a depression in at least one of the firewall and floorboard.

25. The combination according to claim 14, wherein the air distribution channel is formed by a projection in a lower surface of the decoupling layer and received within a depression in at lest one of the firewall and floorboard.

* * * * *

UNITED STATES PATENT AND TRADEMARK OFFICE
CERTIFICATE OF CORRECTION

PATENT NO. : 6,547,301 B1
DATED : April 15, 2003
INVENTOR(S) : Frederick P. Keller It is certified that error appears in the above-identified patent and that said Letters Patent is hereby corrected as shown below:

Column 7,
Line 13, "cover overlaying and closing" should be -- cover overlaying and closing --

Column 8,
Line 44, "a depression in at lest one" should be -- a depression in at least one --

Signed and Sealed this

Nineteenth Day of August, 2003

JAMES E. ROGAN
*Director of the United States Patent and Trademark Office*